April 18, 1961     J. B. WINTHER     2,980,812

DYNAMOMETER

Original Filed July 17, 1957     3 Sheets-Sheet 1

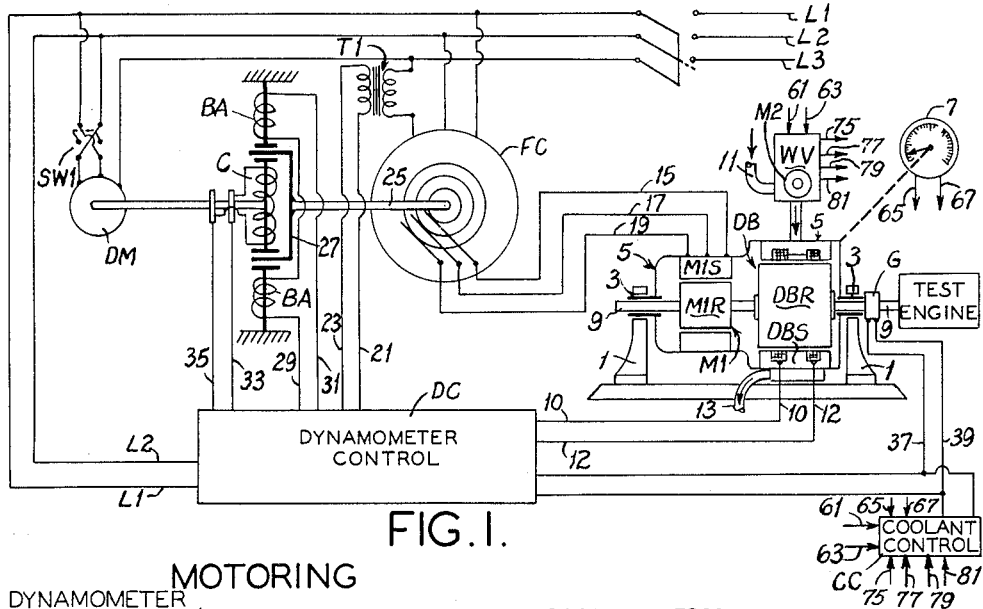

FIG. 1.

MOTORING

| DYNAMOMETER SHAFT SPEED | 0 | 1800 | 3600 | 5400 | 7200 |
|---|---|---|---|---|---|
| CONVERTER SHAFT SPEED | −1800 (CCW) | | 0 | (CW) | +1800 |
| DRIVE MOTOR DM | DE-ENERGIZED | | ENERGIZED | | |
| BRAKE BA | MINIMUM (ENERGIZATION) ⟶ MAXIMUM | | DE-ENERGIZED | | |
| CLUTCH C | DE-ENERGIZED | | MINIMUM (ENERGIZATION) ⟶ MAXIMUM | | |
| A.C. FREQ. MOTOR M1 | 0 | 30 | 60 | 90 | 120 |

FIG. 2.

ABSORBING

| DYNAMOMETER SHAFT SPEED | 0 | 1800 | 3600 | 5400 | 7200 |
|---|---|---|---|---|---|
| CONVERTER SHAFT SPEED | −1800 (CCW) | | 0 | (CW) | +1800 |
| DRIVE MOTOR DM | ENERGIZED | | DE-ENERGIZED | | |
| BRAKE BA | DE-ENERGIZED | | MINIMUM (ENERGIZATION) ⟶ MAXIMUM | | |
| CLUTCH C | MINIMUM (ENERGIZATION) ⟶ MAXIMUM | | DE-ENERGIZED | | |
| A.C. FREQ. MOTOR M1 | 0 | 30 | 60 | 90 | 120 |

FIG. 3.

Jerrold B. Winther,
Inventor.
Koenig and Pope
Attorneys.

Jerrold B. Winther,
Inventor.
Koenig and Pope
Attorneys.

United States Patent Office 2,980,812
Patented Apr. 18, 1961

2,980,812

DYNAMOMETER

Jerrold B. Winther, Kenosha, Wis., assignor to Eaton Manufacturing Company, Cleveland, Ohio, a corporation of Ohio Original application July 17, 1957, Ser. No. 672,510, now Patent No. 2,943,481, dated July 5, 1960. Divided and this application Oct. 27, 1958, Ser. No. 769,825

7 Claims. (Cl. 310—93)

This invention relates to dynamometers for engine testing and more particularly to liquid-cooled motoring dynamometers.

This application is a division of my copending application Serial No. 672,510, filed July 17, 1957, now Patent No. 2,943,481, dated July 5, 1960.

Among the several objects of this invention may be noted the provision of motoring dynamometers which are useful in testing both the power output and friction resistance of various types of power plants, such as, for example, internal-combustion engines; the provision of dynamometers of the class described which will test engines at speeds at and above 5000 r.p.m.; the provision of liquid-cooled dynamometers which have greatly decreased coolant drag load; the provision of such dynamometers which have a more rapid and positive control of coolant flow in response to load and speed changes; and the provision of dynamometers which are compact in construction and efficient in operation. Other objects and features will be in part apparent and in part pointed outer hereinafter.

The invention accordingly comprises the constructions hereinafter described, the scope of the invention being indicated in the following claims.

In the accompanying drawings, in which one of various possible embodiments of the invention is illustrated:

Fig. 1 is a diagrammatic view of a dynamometer system incorporating the present invention;

Figs. 2 and 3 are tables illustrating the operational interrelationship of various components of the apparatus of Fig. 1;

Corresponding reference characters indicate corresponding parts throughout the several views of the drawings.

Figure 5:
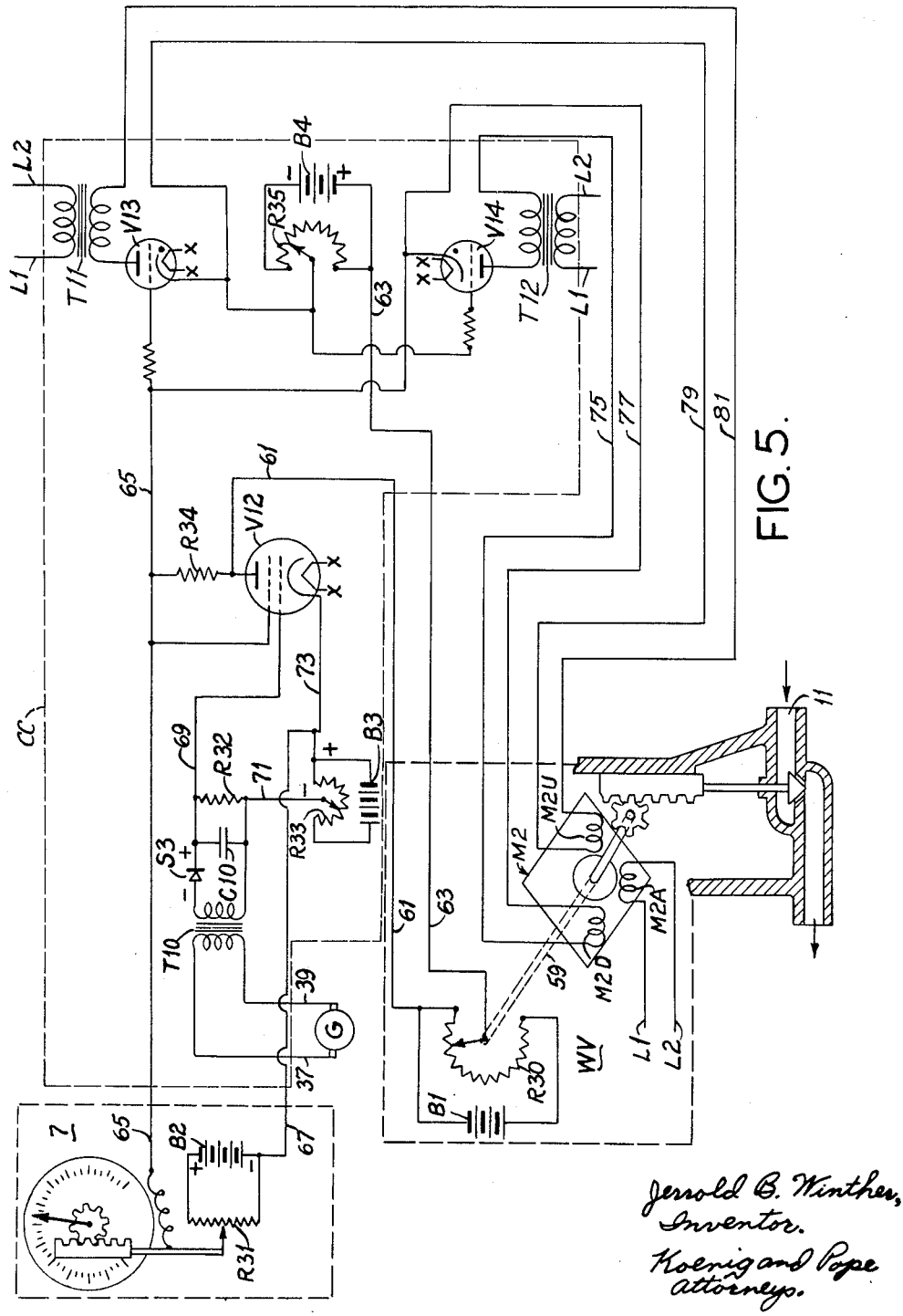

Dynamometers have long been employed as instruments in testing and determining power output and friction resistance of various types of power plants. However, the maximum operational speeds of most existing dynamometers which are A.C. operated, have been limited by the A.C. power source frequency of 60 c.p.s., i.e., to speeds of about 3600 r.p.m. Also, the power or torque absorbing capabilities of dynamometer systems have had to be increased in step with the more powerful engines being developed and the cooling of the power absorbing components of the dynamometers has presented increasingly difficult problems. At high-speed operation, for example, the amount of coolant required to provide adequate heat transfer produces a drag load on the system which may approximate or even exceed the desired test load and the coolant drag at minimum flow often rises above the desired minimum torque requirements of these dynamometers.

In accordance with the present invention, I have developed a dynamometer system which operates from the usual A.C. power source and in which operational speeds are in excess of 5000 r.p.m. Moreover, I have been able to eliminate the usual variable speed coupling between the A.C. motor used to drive the dynamometer shaft in a motoring mode, and therefore avoid the need of cooling the elements of such couplings, thereby markedly decreasing the coolant drag load. Also, two coordinated means of absorbing power are provided, one of which converts the energy absorbed in the absorption mode into A.C. of line frequency and transfers it into the power lines. Additionally, the dynamometer system of this invention incorporates a novel coolant control system which is rapid and positive in its response to speed and load changes.

Referring now more particularly to Fig. 1, a pair of pedestals 1 is indicated mounting bearings for trunnions 3 of a dynamometer case 5. This case rocks in the bearings and is linked through a reversible torque arm linkage to a force measuring scale 7. Further details of the reversible linkage will not be set forth, since these are common on many dynamometers now in use, their purpose being simply to obtain a reading on the scale 7 in either direction of force of application as determined by the moment of the torque arm. It will be understood that the case 5 rocks freely in pedestals 1 for the limited distance required by the scale movement.

Journalled in bearings within the rocking case 5 is a dynamometer shaft 9. Keyed to shaft 9 is a rotor DBR of an electric dynamometer brake DB of the eddy-current type. Fixed to the inside of case 5 is a stator DBS of brake DB which includes annular D.C. field coils, which when electrically energized through a pair of wires 10 and 12 from a dynamometer control unit DC generate a toric flux field interlinking the rotor and stator of brake DB. If shaft 9 is rotated and stator DBS is excited, eddy currents will be generated in rotor DBR resisting the rotation of shaft 9 and applying the resulting torque to the rocking case 5. The force of this torque is transferred to the scale 7 through the reversible linkage. From the scale reading, horsepower developed by any prime mover (such as indicated by the test engine of Fig. 1) coupled to shaft 9 can be determined. The heat generated by the action of dynamometer brake DB is carried off by a liquid coolant, such as water, which is circulated in heat exchange relationship between and/or around the brake rotor and stator. The cooling circuit for the water includes an inlet pipe 11, a water proportioning valve unit WV and a water outlet pipe 13.

Also keyed to shaft 9 is a rotor M1R of an A.C. induction motor M1. A stator M1S of M1 is attached to the inside of case 5 and is electrically interconnected by wires 15, 17 and 19 to the rotor of a frequency converter FC of the induction type, preferably of the four-pole type. Motor M1 in the motoring operational mode is supplied with A.C. power of adjustable frequency to drive shaft 9 at any preselected speed. In the absorption operational mode of the dynamometer, M1 functions as an A.C. generator transferring energy proportional to the torque applied to shaft 9 by the test engine to the rotor of converter FC. The stator of converter FC is electrically connected to a conventional source of A.C. power as indicated at L1, L2 and L3, the frequency of which is fixed, usually at 60 c.p.s. A current transformer T1 has its primary series-connected in one of the leads between the line and the converter stator. The secondary of T1 is interconnected by conductors 21 and 23 to control unit DC.

The frequency converter rotor is keyed to a converter shaft 25 which also is attached to a rotary coupling member 27. This coupling member is positioned within a braking member BA adapted to apply a variable resisting force to the rotation of shaft 25, and a clutch member C, adapted to drive shaft 25 at an adjustable predetermined speed from a drive motor DM. The brake member BA, including its associated D.C. field coil, and coupling member 27 constitute an eddy-current brake, while clutch member C, including its associated D.C. field coil, constitute an eddy-current clutch. The D.C. field coil of BA is interconnected to a dynamometer control unit DC by wires 29 and 31, while the D.C. field coil of clutch member C is also interconnected to unit DC through slip rings and two wires 33 and 35. Drive motor DM is connected to the three-phase A.C. power source L1, L2 and L3 through a switch SW1 which serves to energize and deenergize DM as well as reverse its direction of rotation.

A governor generator G is attached to shaft 9 and provides an electric control signal, which in this particular embodiment is an A.C. potential having an amplitude which is a function of the speed of shaft 9, via wires 37 and 39 to control unit DC and a coolant control unit CC.

Figure 4:
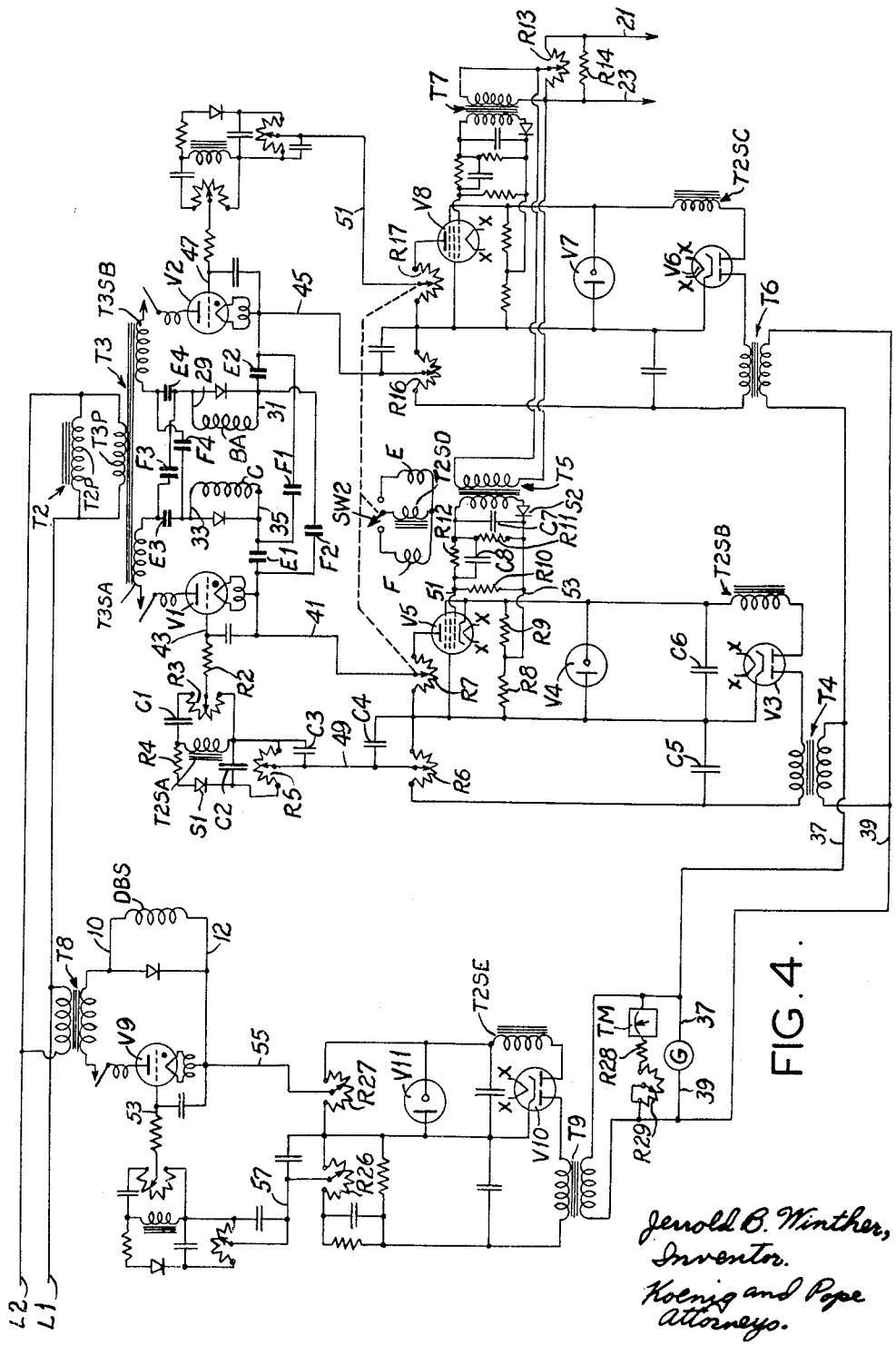
Fig. 4 is a circuit diagram of the dynamometer control unit shown in Fig. 1; and, Fig. 5 is a circuit diagram of the coolant control unit of the present invention shown in Fig. 1.

Referring now more particularly to Fig. 4, the more detailed circuitry of dynamometer control unit DC is illustrated including the interconnection of the D.C. field coils of the converter clutch C, the converter brake BA, the dynamometer brake DB, the generator G, and transformer T1. The A.C. power source L1, L2 is connected to two primary windings T2P and T3P of two power transformers T2 and T3. Transformer T3 has two secondaries T3SA and T3SB, the former supplying A.C. to a half-wave rectifier circuit including a grid-controlled gas rectifier V1, the latter supplying A.C. to a similar half-wave rectifier circuit including a second grid-controlled rectifier V2. A back rectifier is shunted across each of the C and BA field coils, each of which coils is adapted to be alternately energized in either of the half-wave rectifier circuits including V1 and V2. Each of these two half-wave rectifier circuits includes a circuit breaker in series therewith. The filaments or cathodes of V1 and V2 are heated by means of secondaries of transformer T2.

These two half-wave circuits also include eight normally open relay contacts E1, E2, E3, E4, F1, F2, F3 and F4, the actuation of which is controlled by two relay coils E and F. These relay contacts serve as transfer contacts so that below a dynamometer shaft speed of 3600 r.p.m. relay contacts E1–E4 are closed and V1 and V2 supply rectified A.C. to coils C and BA, respectively; whereas above a shaft speed of 3600 r.p.m. relay contacts F1–F4 are closed and V1 and V2 supply rectified A.C. to coils BA and C, respectively. The conductivity of each of the rectifier tubes V1 and V2 is controlled by the grid-cathode potentials respectively supplied by means of wires 41 and 43, and wires 45 and 47. Wire 43 interconnects the grid of V1 through a resistor R2 with the rotor of a potentiometer R3. A condenser C1, a secondary T2SA of transformer T2 and potentiometer R3 constitute a phase shifting network to apply an A.C. rider wave to the D.C. grid bias supplied from a half-wave grid bias rectifier network including a rectifier unit S1, a resistor R4, secondary T2SA and a "slow speed" adjusting potentiometer R5. These grid bias and phase shifting networks also include a filter condenser C2 and a by-pass condenser C3. A wire 49 interconnects the rotor of a "maximum speed" adjusting potentiometer R6, which also includes a by-pass condenser C4 connected from its rotor to one side thereof. A D.C. control voltage proportional to the speed of shaft 9 is developed across R6 by means of a generator rectifier network section comprising a filter condenser C5, one-half of a duo-diode vacuum tube V3 and the secondary of a transformer T4. The primary of T4 is connected to generator G by wires 37 and 39. A D.C. reference voltage is developed across a potentiometer R7, the rotor of which is connected to the cathode of V1 by wire 41. This D.C. reference voltage is supplied by a half-wave rectifier circuit including the other diode section of V3, a filter capacitor C6, a transformer secondary T2SB, a voltage regulator tube V4, and a pair of resistors R8 and R9; and a pentode vacuum tube V5, the anode of which is connected to one side of the "run speed" potentiometer R7. The D.C. reference voltage is modified by the conductivity of tube V5, the control grid-cathode circuit (wires 51 and 53) of which has impressed thereon a torque limiting potential which is a function of the voltage developed by the secondary of the current transformer T1. The torque limiting network producing this V5 grid-cathode potential includes the secondary winding transformer T5, a half-wave rectifier unit S2, a filter condenser C7, two resistors R10 and R11 connected across wires 51 and 53, and a shunt-connected resistor R12 and condenser C8. The primary winding of T5 is interconnected to a torque limiting potentiometer R13 shunted by a fixed resistor R14. Wires 21 and 23 interconnect R13 and R14 to the secondary of current transformer T1.

In essence, therefore, an adjustable D.C. reference voltage potential is provided at potentiometer R7 which potential is modified by an overriding torque limiting signal which will cut off tube V3 upon the A.C. voltage from the secondary of T1 reaching a predetermined level (as adjusted by R13). This torque-limited adjustable D.C. reference voltage or signal is connected in series opposition to the D.C. generator control voltage or signal developed across potentiometer R6. This composite D.C. torque-limited generator control and reference potential or signal (wires 41 and 49), modified by the D.C. grid bias potential and phase shifted A.C. rider wave produced as noted above in the grid bias and phase shifting networks, constitutes the grid-cathode signal controlling the conductivity of V1 and therefore the degree of excitation supplied to converter shaft clutch coil C (or brake coil BA) depending on the energization status of relays E and F.

As the components supplying the rectifier V2 and its associated components are identical with those described in regard to V1, a detailed description is not believed necessary. A composite D.C. torque-limited generator control and reference potential or signal modified by the grid bias and phase shifter networks (connected between wires 47 and 51) is therefore developed across wires 45 and 47 and applied as a signal to the grid-cathode circuit of gas rectifier V2. Tubes V6–V8 and their associated components respectively correspond and function as do tubes V3–V5 described above. Transformers T6, T7 and secondary T2SC correspond in operation to transformers T4 and T5 and secondary T2SB, respectively. A second "maximum speed" potentiometer R16 and a second "run speed" potentiometer R17 correspond in interconnection and function to R6 and R7, respectively. In fact, because of the operation of relay coils F and E and their contacts, the control of clutch coil C may be by the composite potential carried by wires 41 and 49 or by wires 45 and 51. This is accomplished by ganging or tandem-connecting the rotors of potentiometers R7 and R17 together and linking them to a double-throw single-pole switch SW2 which alternately energizes relay coils F and E whereby the former is energized through SW2 from a secondary winding T2SD when potentiometers R7 and R17 are set to a speed above 3600 r.p.m., and the latter (relay coil E) is energized when R7 and R17 are moved to a position corresponding to a controlled speed corresponding to a dynamometer shaft speed of under 3600 r.p.m. The actuation of relay contacts F1–F4 to closed positions connects coil BA across the anode-cathode circuit of V1, and coil C across the anode-cathode circuit of V2; while the alternate closing of E1–E4 transfers the excitation control of coils C and BA to V1 and V2 respectively.

In the left-hand portion of Fig. 4 is illustrated the circuitry for controlling the excitation of the dynamometer brake D.C. field coil DBS. Transformer T8 supplies A.C. power to a half-wave rectifier circuit including a gas rectifier tube V9. A grid-cathode control voltage is applied to tube V9 via wires 53 and 55 in the same fashion as explained above in regard to rectifier tubes V1 and V2. Again, as noted before in regard to the circuitry and operation of tubes V6–V7, tubes V10 and V11 and their associated components correspond in electrical connection and operation to that of tubes V3 and V4. Transformer T9 and a secondary T2SE correspond to transformers T4 (and T6), and secondary T2SB (and T2SC), respectively. The only significant difference between the control circuitry for coil DBS as compared to that discussed above in regard to that controlling coils C and BA is the omission of a torque limiter circuit such as shown including V5 and its associated components (or V8 and its corresponding components). A "maximum speed" potentiometer R26 and a "run speed" potentiometer R27 correspond to R6–R7 and R16–R17. However, the composite D.C. control potential or signal supplied to wire 55 and a wire 57 does not include the overriding torque limiting component as did the composite potentials across wires 41, 49 and wires 45, 51. It will also be noted that the primary of transformer T9 has shunted across it a tachometer indicator TM, a resistor R28 and a rheostat R29 so that the level of the A.C. signal from generator G is indicated and can be adjusted as to primary T9.

Referring now more particularly to Figs. 1–3, the operation of the dynamometer described above is as follows: A test engine is attached to dynamometer shaft 9 and the dynamometer control unit is energized by applying 60 c.p.s. A.C. power to the stator of frequency converter FC and dynamometer control unit DC. If converter shaft 25 is held substantially fixed or immovable, then frequency converter FC will function as a static transformer transmitting 60 c.p.s. power via wires 15, 17 and 19 to the stator M1S of the inductor cage motor M1, which in turn drives shaft 9 in a clockwise direction at approximately 3600 r.p.m. in a motoring mode of operation of the dynamometer. If a motoring shaft speed of less than 3600 r.p.m. is desired then an appropriate adjustment of ganged potentiometers R7 and R17 is made. This moves switch SW2 to energize relay coil E and close contacts E1–E4. As shown in the table of Fig. 2 the speed of converter shaft 25 will then be controlled at a speed of 0–1800 r.p.m. counterclockwise, thus delivering A.C. to motor M1 of a frequency less than 60 c.p.s.

Assuming a dynamometer shaft speed of 1800 r.p.m. is selected by adjustment of R7, R17, the shaft 25 will operate at 900 r.p.m. counterclockwise. The dynamometer control unit DC accomplishes this because at that setting of R7, R17 a control signal is applied to the grid-cathode circuit of V2 to energize brake BA at an intermediate level thus partially restraining the rotation of converter shaft 25. The 1800 r.p.m. speed of shaft 9 is controlled at this level by the operation of the control unit DC which controls the excitation of the clutch C and brake BA to provide an increased or decreased driving force or restraining force, alternately, to converter shaft 25 to maintain it at a controlled predetermined speed of 900 r.p.m. counterclockwise. More specifically, the excitation of the D.C. clutch and brake field coils is regulated and coordinated to provide this substantially constant preset converter shaft speed by "bucking" the rectified A.C. signal voltage from generator G against the adjustable D.C. reference voltages established by tandem potentiometers R7 and R17. As the circuitry operation of such clutch-brake transfer controls responsive to incipient shaft speed changes (dynamometer shaft 9 in the present instance) to maintain this speed at a substantially constant preselected value is fully understood by those skilled in the art and is explained in further detail in coassigned U.S. Patent 2,411,122, additional details are not included herein.

Thus, the speed of shaft 9 in the motoring mode is maintained at any preselected speed including those above 3600 r.p.m. by cooperative action of clutch C, brake BA, drive motor DM and frequency converter FC by controlling the rotational speed of converter shaft 25. As indicated in the Fig. 2 table, the frequency supplied by wires 15, 17 and 19 to A.C. cage motor M1 can be controlled at preselected values from about 0 up to 120 c.p.s., the latter corresponding to a 7200 r.p.m. dynamometer shaft speed. It will be noted therefore that where the output frequency of FC in a motoring mode is to be held at less than 60 c.p.s., brake BA absorbs the difference in energy required to convert the 60 c.p.s. to the desired controlled lower frequency. At converter frequencies above 60 c.p.s. the energy to convert the 60 c.p.s. power supplied to the stator of FC to a higher frequency is supplied by clutch C.

If even higher dynamometer speeds are desired, drive motor DM could be replaced by one having a 3600 r.p.m. operating speed and the converter shaft speed (when clutch coil C is fully energized) could be increased to nearly 3600 r.p.m. thus providing 180 c.p.s. A.C. to motor M1 and a dynamometer motoring speed of about 10,800 r.p.m. The amount of torque applied to the test motor in the dynamometer motoring mode is continuously indicated by the dial reading on scale 7.

Referring now more particularly to the table of Fig. 3, the operation of the dynamometer and its components in the absorbing mode is indicated. In this mode, the test engine is driving the shaft 9, and any desired test condition is established by the cooperative setting of both the throttle of the test engine and the speed adjusting potentiometers (R7, R17 and R27) of control unit DC. Assuming a preset controlled speed of shaft 9 at 1800 r.p.m. is desired, drive motor DM is energized to drive clutch member C at approximately 1800 r.p.m. counterclockwise and the speed of shaft 25 is thereby maintained at 900 r.p.m. counterclockwise by coordinated automatic energization of clutch C and brake BA. As shaft 9 is being driven at approximately 1800 r.p.m. clockwise, the test engine motor M1 is functioning as an A.C. generator and feeding 30 c.p.s. A.C. power to the rotor of converter FC. The 900 r.p.m. counterclockwise rotation of shaft 25 thereby causes not 30 c.p.s. but 60 c.p.s. to be impressed on the stator of converter FC and permits the power generated by the test engine to be fed back into power source L1, L2 and L3 and thereby dissipated efficiently. Any tendency for the dynamometer shaft speed to change is offset by the cooperative clutch-brake action on the rotor of converter FC which automatically insures close dynamometer shaft speed control at the preset value and the feeding of 60 c.p.s. A.C. into lines L1, L2 and L3. As in the motoring mode, the energy required to convert the A.C. power (in this instance generated by M1) frequency to 60 c.p.s. from frequencies above or below this value, is supplied by clutch C and brake BA depending on whether the controlled speed is above or below 3600 r.p.m.

The components function similarly at absorbing speeds of greater than 3600 r.p.m., with the exception of the control transfer of C and BA to the opposite gas rectifier tubes V1 and V2 resulting from the alternate operation of relays E and F at settings of R7 and R17 above 3600 r.p.m. Shaft speed control during absorption of both high and low speeds is accomplished by means of generator G and the excitation control of clutch C and brake BA, as long as the load absorbed does not exceed a certain preestablished torque level as sensed by current transformer T1. When the A.C. power fed back in the lines by converter FC exceeds this level (e.g., 200 H.P.), then the torque limiting action explained above becomes effective. The speed of shaft 9 will tend to increase above its present level as the excitation levels of field coil C or BA (depending on whether the dynamometer speed is set to above or below 3600 r.p.m.) reach a maximum consistent with the 200 H.P. load handling limit of converter FC. As the speed of shaft 9 incipiently increases at this 200 H.P. level, the dynamometer brake DB automatically comes into operation, assuming that potentiometer R27 is adjusted to a speed setting approximately the same as that of R7 and R17. The D.C. field coil of DBS is then increasingly excited by V9 and its associated control components to apply more restraining force to shaft 9. Thus, additional power absorbing capacity is automatically provided by the action of the torque limiting sections and the action of V9 and DBS, in coordination with the shaft speed signal from generator G. The frequency converter will continue to transfer power to lines L1, L2, L3 up to the 200 H.P. level while the balance of power absorption is by dynamometer brake DB which initially becomes energized at this predetermined torque level of 200 H.P. At the same time, the speed of shaft 9 will be maintained constant at the preset speed by the control action of unit DC up to the limits of load absorption of converter FC combined with that of brake DB.

The substantial quantities of heat developed by brake DB in a dynamometer absorption mode over the 200 H.P. level must be dissipated, and liquid cooling of the rotor DBR and stator DBS is therefore provided by circulating water or some other liquid coolant through a circuit in heat exchange relationship therewith. It is important that the proper amount of water flow through this circuit be maintained consistent with the heat generating action of brake DB. The usual arrangement for controlling the flow of water through the fluid circuit includes thermostats, but the action of such devices is unsatisfactory because of their inherent time lag and the oscillatory over and under control of water flow during periods of rapid load and speed change. The dynamometer system of the present invention overcomes these difficulties by the circuitry and components of a coolant control CC shown in Fig. 5. The water proportioning valve WV for controlling the amount of inlet water is here shown in more detail. The valve is movable continuously from a completely closed position to a maximum flow position by a rack and pinion system, shown diagrammatically, and a motor M2 which has windings or shading coils M2D and M2U and a main winding M2A connected to any appropriate and convenient A.C. power source as indicated at L1, L2. Motor M2 has a shaft extension 59 attached to the rotor of a potentiometer R30. A D.C. potential source such as a battery B1 is electrically connected across the potentiometer R30. The alternate energization of either of the shading coils M2D or M2U will cause valve WV to move toward or away from a closed position and the concurrent movement of the rotor of R30 provides a D.C. potential at wires 61 and 63 proportional to the positioning of valve WV.

The movement of the pointer of the scale 7, which corresponds to the amount of power being absorbed by the dynamometer, causes a proportionate movement of the rotor of another potentiometer R31 across which is connected a D.C. potential source such as a battery B2, thus providing a D.C. potential across wires 65 and 67 proportional to the absorption load level of dynamometer DB.

A third variable D.C. potential or control signal is supplied by the action of generator G, the A.C. output signal of which is rectified by a half-wave rectifier circuit comprising a rectifier unit S3, and also the associated components including transformer T10 and resistor R32. This rectified generator signal is connected in series opposition with an adjustable D.C. bias potential (provided by a D.C. constant potential source, such as a battery B3, and a potentiometer R33) and impressed by means of wire 69 and a wire 73 to the grid-cathode circuit of a tetrode vacuum tube V12, the screen grid of which is connected to the positive polarity wire 65 from the scale potentiometer R31. The anode of tube V12 is also connected through a usual plate load resistor R34 to wire 65. Thus, the conduction of tube V12 is dependent on both the control signals from scale 7 (applied to the anode-cathode circuit of V12 by wires 65, 67 and 73) and the rectified control signal from generator G (as modified by the bias level established by potentiometer R33), which provides a D.C. potential or signal developed across load resistor R34 which is a composite of the two signals. As this composite potential is a function of the product of both the speed of shaft 9 and the load (as indicated at scale 7), this potential actually provides a control signal according to horsepower. The algebraic potential sum of this composite potential (wires 69 and 61) and the potential proportional to the positioning of valve WV (wires 61 and 63) are connected across the grid-cathode circuits of two thyratron tubes V13 and V14 connected in a discriminator circuit in such a way that the signal applied to the grid of V13 is of opposite polarity with respect to its cathode as is the polarity of the grid of V14 with respect to its cathode. Shading coil M2D is interconnected in series with the anode-cathode circuit of V13 and the secondary of a transformer T11 by means of two conductors 75 and 77, while shading coil M2U of motor M2 is similarly connected by conductors 79 and 81 in a series circuit with the anode-cathode circuit of V14 and the secondary winding of a transformer T12. The primary windings of T11 and T12 are connected to any conventional source of A.C. power as indicated at L1, L2. A separation bias supply comprising another D.C. constant potential source, such as a battery B4, and a potentiometer R35 is connected between the cathode of V13 and the grid of V14.

It will be seen, therefore, that any incipient change in (1) the load (as indicated on scale 7), (2) the A.C. signal from generator G (proportional to the speed of dynamometer shaft 9), and (3) the positioning of water valve WV will cause either V13 or V14 to conduct and apply A.C. to the appropriate shading coil M2U or M2D respectively, to move water valve WV in the proper direction to immediately correct the water flow through the coolant circuit to compensate precisely for this incipient change.

It is to be understood that the cathodes of a number of the gas and vacuum tubes are heated by filaments which are connected, as indicated at X—X, to appropriate low voltage power sources. Also, it is to be understood that electric clutch C and brakes DB and BA, other than the eddy-current type illustrated, such as the magnetic fluid type, etc., are equivalents for the purposes of this invention. Furthermore, the control signals herein instead of being applied to cathode-grid circuits of gas or vacuum tubes could be applied to the control windings of magnetic amplifiers or saturable reactors to vary the impedance of the power-windings thereof, and thereby provide (after rectification) a variable deexcitation to the electric brake and clutch coils. Moreover, it is to be understood that customary and conventional on-off switching and holding circuits, protective devices, etc. may be included if desired.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:
1. In a liquid-cooled dynamometer having a rocking case adapted for torque measurement, a rotary shaft in the case adapted for attachment to an engine under test, an electromagnetic dynamometer brake having a stator attached to said case and a rotor attached to said shaft, and a cooling circuit adapted to pass liquid coolant in heat exchange relationship with said brake; a proportioning valve in said coolant circuit adapted to control the flow of coolant through said circuit, a reversing motor for operating said valve, an electric generator responsive to the speed of said dynamometer shaft to produce a first electrical signal, first electric means responsive to movement of said rocking case to produce a second electrical signal, second electric means responsive to instantaneous positioning of said valve to produce a third electrical signal, and an electrical control circuit responsive to the composite of said first, second and third signals to energize said motor in the proper direction to vary the opening of said valve whereby said valve is substantially instantaneously and accurately positioned in response to the level of horsepower actually being absorbed simultaneously by said brake.

2. In a liquid-cooled dynamometer as set forth in claim 1, said first electric means comprising a potentiometer having a rotor mechanically linked to said rocking case, and an electric potential source electrically connected across said potentiometers whereby said second electrical signal thereby produced is a function of the torque being absorbed by said dynamometer brake.

3. In a liquid-cooled dynamometer as set forth in claim 2, said second electric means comprising a second potentiometer having a rotor mechanically linked to said valve, and a second electric potential source electrically connected across said potentiometer whereby said third electrical signal thereby produced is a function of said valve positioning.

4. In a liquid-cooled dynamometer as set forth in claim 3, said electric control circuit including an electric amplifying device having an input and output, said first electrical signal being connected in series opposition with an adjustable reference voltage source and the resulting composite potential being applied to said input.

5. In a liquid-cooled dynamometer as set forth in claim 4, said second signal being applied as a power source to said amplifying device whereby the composite signal produced at said output is a function of both said first and second signals.

6. In a liquid-cooled dynamometer as set forth in claim 5, said electric control unit further including a discriminator responsive to said composite signal and said third signal to selectively energize the motor to vary the opening of said valve.

7. In a liquid-cooled dynamometer as set forth in claim 6, said motor being of the shaded pole type.

No references cited.